United States Patent
Posener (10) Patent No.: US 10,143,616 B2
(45) Date of Patent: Dec. 4, 2018

(54) HOSE CONNECTING DEVICE AND MASSAGE TOY HAVING SUCH A HOSE CONNECTING DEVICE

(71) Applicant: FUN FACTORY GmbH, Bremen (DE)

(72) Inventor: Heiko Posener, Buchholz/Vorwerk (DE)

(73) Assignee: FUN FACTORY GMBH, Bremen (DE)

( * ) Notice: Subject to any disclaimer, the term of this patent is extended or adjusted under 35 U.S.C. 154(b) by 596 days.

(21) Appl. No.: 14/720,259

(22) Filed: May 22, 2015

(65) Prior Publication Data

US 2015/0335517 A1    Nov. 26, 2015

(30) Foreign Application Priority Data

May 23, 2014 (DE) ......................... 10 2014 209 929

(51) Int. Cl.
| | |
|---|---|
| *A61H 9/00* | (2006.01) |
| *F16L 33/22* | (2006.01) |
| *F16L 33/34* | (2006.01) |
| *B29C 70/74* | (2006.01) |
| *A61H 1/00* | (2006.01) |

(Continued)

(52) U.S. Cl.
CPC ............. *A61H 9/005* (2013.01); *A61H 1/008* (2013.01); *A61H 19/32* (2013.01); *A61H 19/50* (2013.01); *A61H 23/02* (2013.01); *B29C 70/74* (2013.01); *F16L 33/003* (2013.01); *F16L 33/227* (2013.01); *F16L 33/30* (2013.01); *F16L 33/34* (2013.01); *F16L 47/06* (2013.01); *A61H 2201/165* (2013.01); *B29L 2031/753* (2013.01)

(58) Field of Classification Search
None
See application file for complete search history.

(56) References Cited

U.S. PATENT DOCUMENTS 4,603,888 A * 8/1986 Goodall ............. F16L 33/2076
285/148.13
4,817,997 A * 4/1989 Ingram ............... F16L 33/2076
285/256

(Continued)

FOREIGN PATENT DOCUMENTS

| DE | 1926538 | 11/1965 |
|---|---|---|
| DE | 7539855 | 11/1977 |

(Continued)

OTHER PUBLICATIONS

Extended European Search Report issued in connection with European Patent Application No. 15169226.6, dated Oct. 6, 2015. (6 pages).

*Primary Examiner* — Stephen R Crow
(74) *Attorney, Agent, or Firm* — K&L Gates LLP (57) ABSTRACT

According to the invention it is provided that a hose connecting device for connecting an elastic flexible hose to a rigid connection includes at least one coupling element having first positively locking means for coupling to the connection portion in positively locking relationship, and an annular support body which peripherally supports the coupling element, wherein the positively locking means extend radially internally on the annular support body and wherein the annular support body is adapted for fixing to the flexible hose.

16 Claims, 6 Drawing Sheets

(51) Int. Cl.
*F16L 33/00* (2006.01)
*F16L 33/30* (2006.01)
*F16L 47/06* (2006.01)
*A61H 19/00* (2006.01)
*A61H 23/02* (2006.01)
*B29L 31/00* (2006.01)

(56) References Cited

U.S. PATENT DOCUMENTS

| | | | | |
|---|---|---|---|---|
| 7,303,553 | B2* | 12/2007 | Ott | A61M 1/10 604/533 |
| 8,752,867 | B2* | 6/2014 | Mager | F16L 33/2071 285/256 |
| 9,447,904 | B2* | 9/2016 | Kury | F16L 33/207 |
| 9,458,958 | B2* | 10/2016 | Kury | F16L 33/2076 |
| 2010/0194100 | A1* | 8/2010 | Koch | F16L 33/2076 285/256 |

FOREIGN PATENT DOCUMENTS

| | | |
|---|---|---|
| DE | 3815167 | 9/1989 |
| DE | 9406337 | 6/1994 |
| DE | 202013103173 | 8/2013 |
| WO | 01/63163 | 8/2001 |

\* cited by examiner

HOSE CONNECTING DEVICE AND MASSAGE TOY HAVING SUCH A HOSE CONNECTING DEVICE

CROSS REFERENCES TO RELATED APPLICATIONS

The present application claims priority to German Priority Patent Application 102014209929.3, filed May 23, 2014, which is hereby incorporated by reference in its entirety.

BACKGROUND

The invention concerns a hose connecting device for connecting an elastic flexible hose to a rigid connection portion. The invention also concerns a hose having a hose connecting device, a system and a massage toy having a toy body which is in the form of a rigid connection portion and has an electric device for operation of the massage toy and an elastic toy casing which is in the form of a flexible hose and is connected to the toy body to form a massage shaft.

A problem which frequently arises is that of connecting elastic flexible hoses to a rigid connection portion in fluid-tight relationship. Usually in that case one end of the hose is pushed on to the connection portion in socket-like relationship and fixed for example with a hose clip in force-locking relationship by a clamping action. It is also known for the elastic flexible hose to be connected to the connection portion by means of an adhesive join. Such an adhesive join is wide-spread in particular in the case of the massage toys referred to in the opening part of this specification, in which an elastic flexible casing, for example a silicone body, is connected to a toy body which in general is made of a hard plastic material and forms the handle of the massage toy. The use of hose clips is not possible in such massage toys for optical, hygiene and health reasons.

It is also known in the field of massage toys for the flexible casing to be connected to the toy body by means of a clamping connection. That is disclosed for example in DE 20 2013 103 173 U1. The elastic casing in that massage toy is fitted into an annular groove on the handle and fixed there in force-locking relationship by means of an inner and an outer clamping ring. A disadvantage with this is that on the one hand a number of working steps are necessary to connect the toy casing to the toy body, while on the other hand there are small slots and openings at the connecting location, which are undesirable for hygiene reasons.

Various hose connecting devices for connecting two hoses or for connecting a hose to a connection portion in positively locking relationship are known from the general field of hose connections. Such hose connecting devices are disclosed for example in DE 1 926 538, DE 75 39 855 U1 or WO 01/63163 A1. In those three devices a respective hose portion is pushed on to a rigid connection portion in socket-like relationship. Arranged between the hose portion and the rigid connection portion is an annular intermediate body which has various positively locking means like for example hooks, latching noses or projections. The intermediate body co-operates at its inward side with the outside peripheral surface of the connection portion and at its outward side with the radially inner surface of the hose portion.

Admittedly such a device provides a simple and positively locking connection between a hose portion and a connection portion, which can also be fluid-tight depending on the respective configuration of the intermediate body. It will be noted however that all three devices require the hose portion to be of a certain strength as otherwise a permanent positively locking connection is not guaranteed.

Accordingly, in the case of the three hose connecting devices known from the state of the art, when an elastic flexible hose is pushed over the connection portion in socket-like relationship, an additional element like for example a hose clip is always necessary to make a permanent connection. For reasons already mentioned however that cannot be used in the massage toys set out in the opening part of this specification.

Therefore the object of the present invention is to provide a hose connecting device, by means of which an elastic flexible hose can be connected to a rigid connection portion in simple fashion durably and in particular in fluid-tight relationship.

SUMMARY

In a hose connecting device of the kind set forth in the opening part of this specification that object is attained with the features of claim 1, more specifically by the hose connecting device including at least one coupling element having first positively locking means for coupling to the connection portion in positively locking relationship, and an annular support body which peripherally supports the coupling element, wherein the positively locking means extend radially internally on the annular support body and wherein the annular support body is adapted for fixing to the flexible hose. After fixing, nullification of the fixing is no longer intended or release of the fixing is not intended without damage to or destruction of the fixing.

Insofar as the joint between the hose and the connection portion is fluid-tight in the present application that means in particular water- and secretion-tight.

The scope of protection of claim 1 also embraces the joint between a hose and a connection portion which are both equally or approximately equally rigid or equally elastic or flexible, even if preferably the hose is more flexible or less rigid than the connection portion.

Accordingly the at least one coupling element has first positively locking means for coupling to the connection portion in positively locking relationship. The connection portion preferably has second positively locking means corresponding to the first positively locking means. The positively locking means are adapted to permit positively locking coupling or connection between the elastic flexible hose and the rigid connection portion. According to the invention the at least one coupling element which has the first positively locking means is peripherally supported by means of an annular support body. The support body serves to impart a certain degree of stability to the elastic flexible hose in the region of the connection to the rigid connection portion and to limit the elasticity of the hose. It provides for peripheral support for the coupling element and ensures that the flexible hose cannot substantially elastically expand peripherally, that is to say in the tangential direction, in the region of the connection. For that purpose according to the invention the support body is adapted to be fixed to the flexible hose so that it supports the hose and carries tangential forces. Preferably the annular support body is fixed radially internally to the hose, for example by means of adhesive. That provides that the coupling forces which occur in the positively locking connection between the hose and the connection portion are carried by the support body and thus the elastic flexible hose can be connected to the rigid connection portion.

In a first preferred configuration of the invention the annular support body is adapted to be fitted into the flexible hose in material-bonded relationship. That is a particularly preferred mode of fixing and in that way the support body can already be integrated or fitted into the hose in manufacture thereof, for example upon injection moulding, extrusion, hand moulding or the like. In that case the support body is preferably fitted into the hose in such a way that the positively locking means of the coupling element are accessible. That ensures that the hose can be connected to the connection portion, with the support body fitted therein.

In a further preferred embodiment the annular support body is of a thin-walled configuration which is non-elastic in the tangential direction. The term 'non-elastic' is here to be interpreted as meaning that the annular support body is substantially less elastic than the flexible elastic hose in order thus to substantially resist peripheral enlargement. By virtue of the annular support body being thin-walled, it can be particularly easily and advantageously fixed to or fitted into the hose. In addition it thus permits a certain degree of flexibility and can be for example radially compressed or bent. Preferably the annular support body is also non-elastic in the axial direction.

It is particularly preferred for the annular support body at least portion-wise to comprise a mesh. Preferably the annular support body completely consists of a mesh (under some circumstances with bars or rods disposed therein). A mesh can be fixed in a simple fashion to the flexible hose and particularly well fitted into same. In addition a mesh is light and provides adequate strength or non-elasticity for the support body. Preferably in that respect warp threads of the mesh are oriented along the periphery of the support body and perpendicularly to a central axis of the support body and weft threads are oriented along the central axis, or vice-versa. That therefore makes use of the tension-resistant direction of the mesh for carrying the tangential forces.

In that respect it is preferred for the mesh to be a plastic mesh. A plastic mesh is easy and inexpensive to manufacture. In addition a plastic mesh can be easily used with the hose which is also preferably formed from a plastic like for example a synthetic rubber or a silicone material.

Particularly preferably the mesh is a gauze material. By virtue of its kind of mesh gauze affords a particularly advantageous and simple connectability to the elastic hose, in particular when the support body is fitted into the elastic hose. In addition due to the low thread density gauze affords a higher level of shear elasticity so that the overall elasticity of the hose can be maintained.

Preferably the thread number of warp and weft of the mesh is in the range of between 10 and 20 per centimeter, particularly preferably in the range of between 15 and 20, in particular about 16 or 17. In that respect the thread size is preferably between 150 and 250 µm, particularly preferably between 200 and 220 µm, in particular being 200 µm. The open mesh area in that case affords a preferred value of between 40 and 50%, particularly preferably 46%. Preferably both warp and weft have a tensile strength of about 1300 N/m$^2$.

In a further particular configuration of the invention there is provided a multiplicity of coupling elements, in particular four, five, six or seven coupling elements, distributed around the periphery of the annular support body. By the provision of not just one coupling element but a multiplicity of coupling elements improved capability of connection between the flexible elastic hose and the connection portion is achieved and the coupling forces can be distributed around the periphery. A secure connection is achieved, which has less of a tendency to self-induced release. Preferably the coupling elements are distributed uniformly around the periphery. If for example there are four coupling elements, they are preferably respectively arranged displaced through 90° relative to each other. With six coupling elements they are preferably arranged displaced through 60° relative to each other. It is not preferable to provide an excessively large number of coupling elements like for example 20 coupling elements as the flexibility of the annular support body can suffer from that and a positively locking connecting action between the hose and the connection portion is made difficult.

Preferably the individual coupling elements are connected together by means of the annular support body. For example the coupling elements can be connected to the support body in one piece. Preferably for example the coupling elements are glued radially internally on to the annular support body. Particularly preferably the coupling elements are welded radially internally to the support body by means of plastic welding. In an alternative the coupling elements are part of the annular support body and are respectively connected together by portions of for example the mesh.

In a further alternative the coupling elements and the support body are formed in one piece, for example from a plastic material, and the portions between the coupling elements are in the form of portions of small material thickness so that they are foil-like. That makes the device particularly simple to manufacture.

In a preferred development the coupling element has an opening forming the first positively locking means. The opening preferably extends in the radial direction into the coupling element.

Preferably the opening forms a portion which can be engaged behind and which can be engaged behind by a corresponding second positively locking means on the connection portion in order thereby to make the positively locking connection. That is a simple way of making the positively locking connection, which is also easy to make. The opening can be defined for example by a wall, a ramp, a projection of a step, a groove, a latching nose or the like.

Preferably the opening is surrounded by a wall which projects radially inwardly with respect to the annular support body and which narrows the internal free cross-section with respect to the annular support body. The wall which preferably also forms the edge of the opening is preferably so arranged that it is oriented substantially in flush surface relationship with the inside surface of the hose when the support body and the coupling elements are fixed to the hose, in particular being fitted into same.

In a further preferred configuration the coupling element has a guide for guiding the second positively locking means of the connection portion when making the connection between the elastic flexible hose and the rigid connection portion. Such a guide on the one hand facilitates connecting the hose to the connection portion in positively locking relationship, by the second positively locking means being guided when making the connection, whereby handling by a fitter is substantially simplified. In addition the guide further ensures that the second positively locking means come into engagement with the first positively locking means and thus the positively locking connection is made.

Particularly preferably the guide has an inclined surface which in the axial direction narrows the free internal cross-section from an axial end of the annular support body to the first positively locking means. An inclined surface of that kind, which forms a ramp, is a simple element for forming a guide. The inclined surface enlarges the free cross-section from the positively locking means towards the axial end of the device and preferably towards the axial end of the hose and thus forms a kind of inclined insertion guide means for the connection portion, which further simplifies the assembly operation and making the positively locking joint between the hose and the connection portion.

It is further preferred that the coupling element has a second guide for guiding the second positively locking means of the connection portion when producing the connection of the elastic flexible hose to the rigid connection portion, which with respect to the first positively locking means is oriented towards the oppositely disposed axial end of the annular support body. That provides that the device including the support body and the coupling element is of a symmetrical configuration with respect to a plane perpendicular to the central axis of the annular support body. In that way fixing of the support body together with the coupling element to the flexible elastic hose is independent of an axial orientation of the device, whereby implementation is further simplified. The susceptibility to error in the implementation process is reduced and faulty assembly is prevented.

It is further preferably provided that the guide has lateral delimiting means. The lateral delimiting means are preferably in the form of walls or legs which are preferably formed in one piece on the coupling element. They preferably form a delimitation between the guide and the material of the flexible elastic hose when the device is mounted to the latter. On the one hand that further simplifies assembly while on the other hand it is possible to prevent damage to the material of the hose in the assembly procedure.

In accordance with a second aspect of the invention the foregoing object is attained by a hose having a device in accordance with one of the above-described preferred embodiments of a hose connecting device, wherein the annular support body is connected to the hose by a material-bonded connection. In that respect reference is directed in its full entirety to the foregoing description. Preferably the annular support body is integrated into the hose, wherein the first positively locking means are accessible at an inside surface of the hose. The annular support body is preferably integrated into the hose in a connecting portion of the hose which preferably corresponds to an axial end. The annular support body can be integrated into the hose for example upon injection moulding or extrusion or hand moulding of the hose. In that case the hose is flexible and elastic, elastic meaning that the hose is for example peripherally elastically stretchable by virtue of an internal pressure, as is the case for example with silicone hoses or thin-wall rubber hoses.

According to a further aspect the above-indicated object is attained by a system comprising a hose according to one of the above-described preferred embodiments of a hose with a hose connecting device according to the invention and a rigid connection portion, wherein the rigid connection portion on a radially outer surface has at least one latching nose as a second positively locking means. In that respect reference is directed in its full entirety to the foregoing description. The connection portion preferably has a number of latching noses, corresponding to the coupling elements. Particularly preferably the coupling elements are provided with an opening as described above, into which the latching nose of the connection portion can latchingly engage. The latching noses on the connection portion extend radially outwardly from same and define a diameter larger than the inside diameter of the elastic flexible hose. It is therefore preferred that the coupling elements have guides which are preferably in the form of an inclined surface or a ramp, which in their introduction portion define a diameter which corresponds to or is somewhat larger than the diameter of the latching noses. That permits a positively locking connection to be made between the hose and the connection portion in a simple fashion. As the coupling elements are connected together by means of the support body and the latter is preferably formed from a mesh a certain relatively mobility of the coupling elements with respect to each other is made possible whereby making the connection between hose connections is further simplified. In an alternative the second positively locking means on the connection portion are in the form of openings and the first positively locking means on the coupling element are in the form of a latching nose.

In a further fourth aspect the above-indicated object is attained in a massage toy of the kind set forth in the opening part of this specification, in that the toy body and the toy casing are connected by means of a hose connecting device in accordance with one of the above-described preferred embodiments in a hose connecting device. In that respect reference is directed in its full entirety to the foregoing description. In such a massage toy according to the invention the toy casing which generally comprises a soft silicone material and thus forms an elastic flexible hose can be easily connected to the toy body. In that way complicated and expensive adhesive joins and/or weld joins can be eliminated and a permanent positively locking connection between the toy casing and the toy body is guaranteed.

In a further aspect the foregoing object is attained in a method of making a hose connection by the steps:—arranging a hose connecting device in accordance with at least one of the above-described preferred embodiments of a hose connecting device in a casting mould;—introducing liquid plastic material into the casting mould; and—enclosing the support body with the plastic material to form a hose with an integrated hose connecting device.

The method preferably also has the following steps: penetrating mesh material of the support body with the plastic material; hardening and/or cross-linking the plastic material; removing the hose from the casting mould; providing a protective element for the casting mould for protecting the coupling element so that positively locking elements of the coupling element remain free from plastic material. Preferably the plastic material is a silicone material.

The method further preferably has the step: connecting the hose to a connection portion in positively locking relationship by means of the coupling elements. In that case the connection portion is preferably of the configuration as described hereinbefore.

It should be understood that the five aspects of the invention involve identical and similar preferred embodiments as set forth in particular in the appendant claims.

Additional features and advantages are described herein, and will be apparent from the following Detailed Description and the figures.

DETAILED DESCRIPTION

Referring to FIGS. 1 to 5 a hose connecting device 1 has an annular support body 2 and six coupling elements 4. The coupling elements 4 are fixedly connected to the support body 2 and extend from same slightly radially inwardly. All six coupling elements 4 are identical. In this embodiment they extend over the entire axial length of the annular support body 2 and are of a bar-like basic configuration.

The support body 2 is thin-walled and adapted to be fitted into an elastic flexible hose in material-bonded relationship. The support body 2 comprises in portion-wise fashion a gauze mesh 10 having a plurality of warp threads 6 and weft threads 8. The warp threads 6 are oriented along the periphery of the support body 2 and extend perpendicularly to the central axis A (see FIG. 2) of the support body 2. The weft threads 8 extend in the axial direction and parallel to the central axis A. In that way the support body 2 has a certain strength and it can carry tangential forces and stresses.

The gauze mesh comprising the warp and weft threads 6, 8 in this embodiment has a relatively low thread density so that it involves a relatively loose mesh with a low level of shear strength. That is advantageous in order to fit the support body 2 into the material of a hose and to integrate it therein, for example upon injection moulding or extrusion of the hose. The material of the hose which is generally a synthetic rubber material can penetrate into the intermediate spaces between the threads and thus entail a particularly durable connection to the device 1. In addition the relatively loose mesh also affords a high degree of flexibility so that by virtue of the mesh the elasticity of the hose is restricted substantially only in the tangential direction, that is to say against peripheral enlargement.

The six coupling elements 4 are distributed uniformly around the periphery of the support body 2 and form a part thereof. Six mesh portions 10 are respectively disposed between the coupling elements 4 and connect them together. For that purpose the mesh portions 10 are connected to the coupling elements 4 in material-bonded relationship so that there is a substantially unitary surface at the radially outer periphery of the hose connecting device 1. In an alternative the coupling elements 4 are glued with their backs 12 (only one is denoted by references in FIG. 1) against an annular support body 2 of continuous mesh 10.

The coupling elements 4 each have a respective opening 14 forming a first positively locking means. The opening 14 extends in the radial direction on the coupling element 4. In this embodiment the opening 14 is rectangular and is arranged approximately in the centre of the coupling element 4. In other embodiments the opening 14 can also be of other cross-sections, for example round or oval, or can be arranged at the edge of the coupling element 4. In addition it is also possible to provide, instead of an opening 14, another positively locking means like for example a projection, a latching nose, a clip, an undercut configuration or the like.

Figure 1:
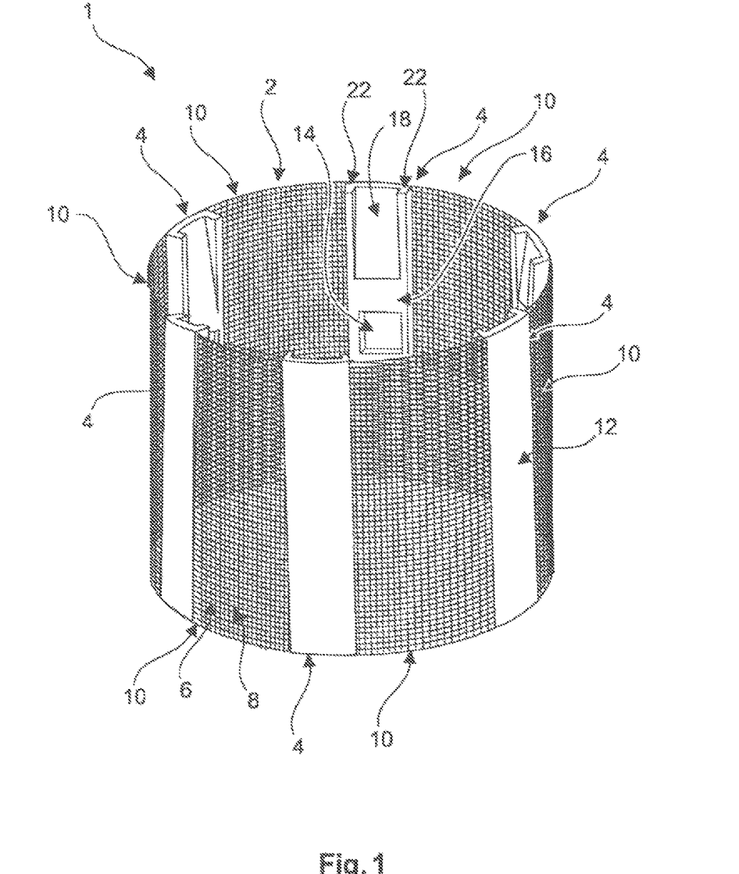
FIG. 1 shows a perspective (diagrammatic) view of a hose connecting device.
Figure 2:
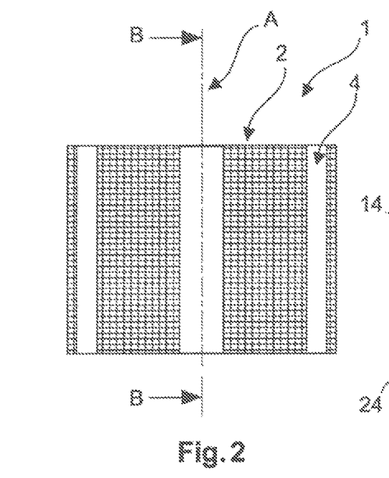
FIG. 2 shows a side view of a hose connecting device.
Figure 3:
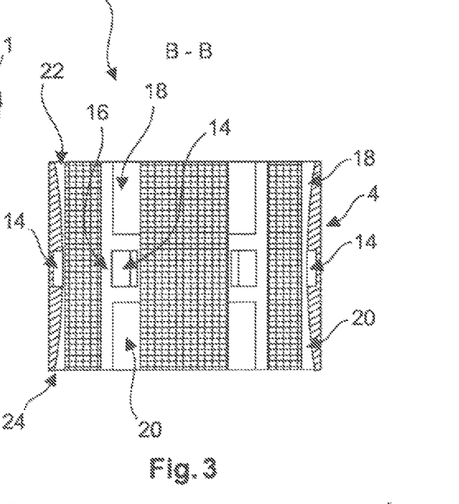
FIG. 3 shows a sectional view along B-B in FIG. 2.
Figure 4:
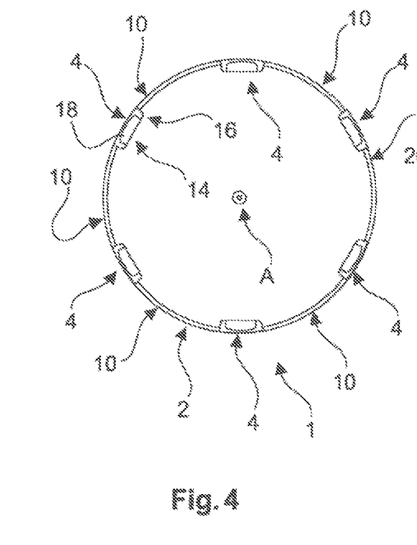
FIG. 4 shows a plan view of a hose connecting device.
Figure 5:
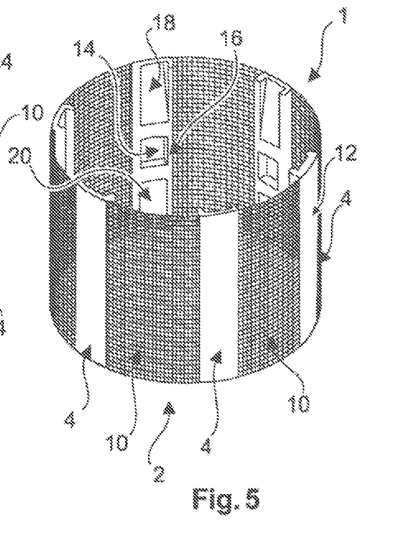
FIG. 5 shows a further perspective (diagrammatic) view of a hose connecting device.

The opening 14 is surrounded by a wall 16 which narrows the internal free cross-section with respect to the annular support body 2 as can be seen in particular from FIG. 4. The wall 16 also forms a delimitation for the opening 14 in relation to the material of the hose as will be described in greater detail hereinafter with reference to FIG. 6.

In addition, provided on the coupling elements 4 are guides 18, 20 which in relation to the opening 14 are arranged at mutually opposite axial ends of the coupling element 4. The guides 18, 20 are each in the form of an inclined surface which extends from the axial ends of the coupling elements 4 to the radially inner end of the wall 16 so that a second positively locking means like for example a latching nose on a connection portion is guided on that inclined surface of the guide 18, 20 from the axial ends, slides as far as the wall 16 and can then latchingly engage into the opening 14. Provided on the guides 18, 20 is a respective delimiting means 22, 24 which is substantially in the form of a prolongation of the wall 16 and, like the wall 16, delimits the coupling element 4 in relation to the material of the hose. The delimiting means 22, 24 serve to clearly define the guide 18, 20 and, upon joining an elastic hose equipped with the device 1 and a corresponding connection portion, they provide that the second positively locking means of the connection portion cannot slip off the guide 18, 20 and thus damage the elastic flexible material of the hose.

Figure 6:
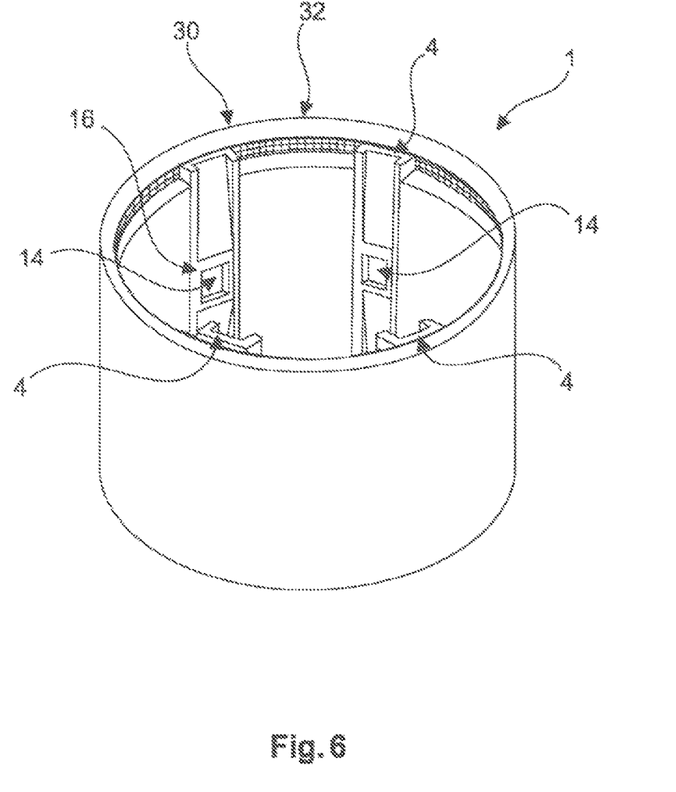
FIG. 6 shows a perspective view of a portion of a hose with a hose connecting device as shown in FIGS. 1 to 5.

FIG. 6 illustrates a portion of a hose 30 according to a further embodiment, with a device 1 being integrated or fitted into the hose 30. Unlike the device 1 shown in FIGS. 1 to 5 the device 1 of FIG. 6 has only four coupling elements 4 arranged around the periphery of a support body (not visible). The support body cannot be seen in FIG. 6 as it is fitted into the material of the hose 30. Identical and similar elements are denoted by the same references so that reference is directed in its full entirety to the foregoing description relative to FIGS. 1 to 5.

The hose 30 of FIG. 6 is formed from a flexible elastic silicone material and can be for example an end portion of a toy casing of a massage appliance. The device 1 together with support body 2 and coupling elements 4 has been incorporated into the hose 30 in the injection moulding operation so that it is integrated therein. The coupling elements 4 each have an opening 14 forming the first positively locking means. The opening 14, as in FIGS. 1 to 5, is of a rectangular shape and is surrounded by a wall 16. A guide is not provided on the coupling elements 4 of FIG. 6. The support body is formed from a gauze mesh.

As can be particularly clearly seen from FIG. 6 however the wall 16 delimits the opening in relation to the material of the hose 30. The radially inner surface of the wall 16 is in substantially surface flush relationship with the radially inner surface of the hose 30. In that way the hose 30, in the assembled condition, can bear with its radially inner surface substantially completely against the inserted connection portion 40 (see FIG. 10). As shown in FIG. 6 the hose further has an axial annular projection 32 acting as a seal. The axial position of the hose 30 on the connection portion 40 is definedly predetermined by the coupling elements 4 which co-operate with their positively locking means 14 with corresponding positively locking means on the connection portion 40. The annular projection 32 can therefore for example co-operate with an axial wall 50 on the connection portion 40 and, by way of the defined axial position of the hose 30 on the connection portion 40, can be acted upon with a defined prestressing force in order thereby to form a seal. In addition a further annular projection can be provided at the radially inner surface of the hose 30, which annular projection is pressed by way of the support body (not visible in FIG. 6) on to the connection portion 40 with a defined prestressing force in order in that way to form a seal. In that fashion it is possible to make a fluid-tight connection between a hose 30 and a connection portion 40, by means of the hose connecting device 1 according to the invention.

Figure 7:
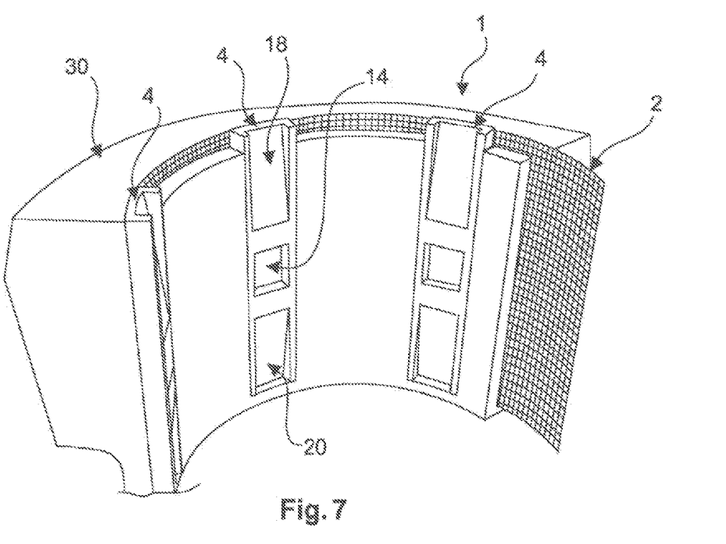
FIG. 7 shows a cross-section through a hose connecting device with hose.

FIG. 7 shows a further perspective sectional view of a hose connecting device 1 which is fitted into a hose 30. The device 1 again has an annular support body 2 and a plurality of coupling elements 4. As can be particularly clearly seen from FIG. 7 the support body 2 is inserted completely into the material of the hose 30 and hose material is arranged on both sides both internally and also externally on the support body 2. The hose material is preferably a silicone material and silicone has the capability of penetrating into very small apertures of about 1 µm. With a warp-weft number of about 16 to 17 per centimeter, as is preferred, that gives a mesh size of about 400 µm so that silicone material also penetrates between the threads into the mesh openings of the mesh of the support body 2 and thus a very good connection is produced between the support body 2 and the hose 30. The opening 14 and the inclined surfaces 18, 20 of the coupling elements 4 are accessible at the inside of the hose 30 so that the latter can be connected to a corresponding connection portion.

Figure 8:
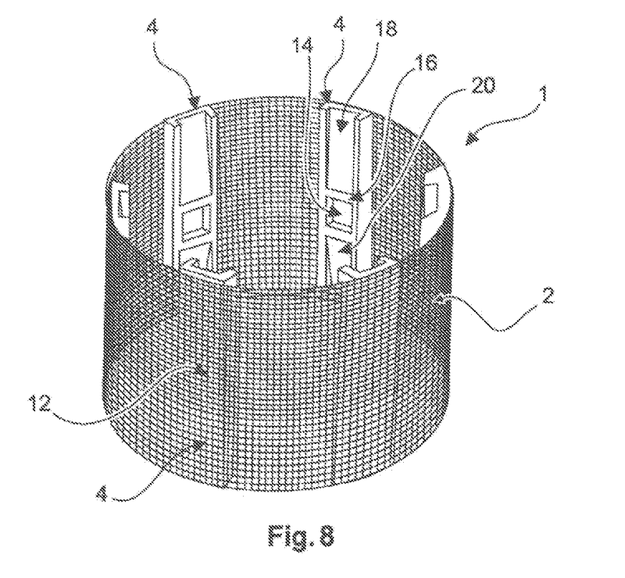
FIG. 8 shows a further perspective (diagrammatic) view of a hose connecting device (typical model view)

FIG. 8 shows the device 1 in an alternative form. In contrast to the device 1 shown in FIG. 1 the support body 2 in this embodiment (FIG. 8) is made throughout from a mesh and is of a cylindrical basic shape. The coupling elements 4 are fixed with their backs 12 (only one is provided with references in FIG. 8) against the mesh of the support body 2 by means of plastic welding on the inside of the support body 2. On the one hand that makes it easy to manufacture the device 1. In addition a very good securing action is also achieved between coupling elements 4 and the support body 2 in the axial direction. In this embodiment 8 the coupling elements also have openings 14, a radially inwardly projecting edge 16 and guides 18, 20 and are overall of an identical configuration to the above-described coupling elements 4.

Figure 9:
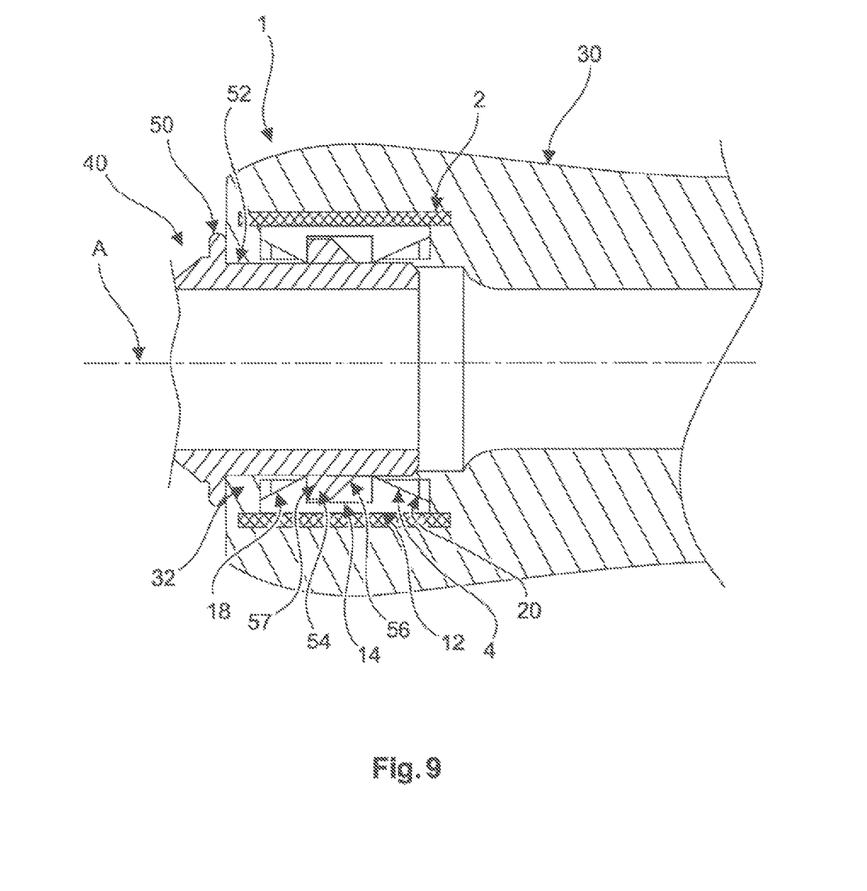
FIG. 9 shows a cross-section through a hose connecting device in the assembled condition with a connection portion.

FIG. 9 shows a cross-sectional view illustrating the co-operation of the device 1 which is integrated in a hose 30 with a connection portion 40. The connection portion 40 is shown separately in FIG. 10 and is described in detail hereinafter.

As can be seen from FIG. 9 the device 1 in turn has an annular support body 2 on which coupling elements 4 (only two are to be seen in FIG. 9) are arranged radially internally. The device 1 is integrated into the material of the hose 30 in such a way that the opening 14 and the guides 18, 20 are radially internally accessible. The coupling elements 4 are fixed with their backs 12 radially internally to the support body 2.

On its cylindrical peripheral surface 52 the connection portion 40 has a plurality of second positively locking means 54 in the form of latching noses. The number of second positively locking means 54 which are distributed around the periphery corresponds to those of the coupling elements 4. The positively locking means 54 have an inclined surface 56 which is intended to co-operate with the guide 18 of the coupling elements 4 when the hose 30 is joined to the connection portion 40. Admittedly the hose 30 is shown in FIG. 9 as being fitted on to the connection portion 40, but it will be easily seen from FIG. 9 how the coupling elements 4 cooperate with the positively locking means 54 when joining the hose 30 to the connection portion 40. Firstly the hose 30 is fitted on to the connection portion 40 from the right with respect to FIG. 9 until the guides 18 come into contact with the inclined surfaces 56. If now the hose 30 is further pushed from right to left with respect to FIG. 9 the coupling elements are slightly lifted on their side having the guide 18 and displaced radially outwardly, which is permitted by the certain but limited degree of elasticity of the support body 2. If now the hose 30 is further pushed on to the connection portion 40 the coupling elements 4 further slip on the positively locking means 54 until they pass into the opening 14 and thus latch the device 1 on the connection portion 40. On the side opposite to the inclined surface 56 the positively locking means 54 have an edge 57 which in itself extends perpendicularly to the longitudinal axis A so that, when the positively locking means 54 is latchingly engaged into the opening 14, a positively locking connection is provided between the device 1 and the connection portion 40 and thus also between the hose 30 and the connection portion 40, which can no longer be released without considerable effort. To release the positively locking connection for example the coupling elements 4 would have to be lifted again with a tool so that the edge 16 passes around the opening 14 over the positively locking means 54 and thus the hose 40 can be pulled off the connection portion 40 again.

At its head end (at the left with respect to FIG. 9) the hose 30 has an annular projection 32 (see also FIG. 6). That annular projection 32 is of a diameter which is reduced in relation to the coupling elements 4. That provides a seal between the annular projection 32 and the peripheral surface 52 of the connection portion 40 and thus the hose 30 is sealed in the connection portion 40. The radial pressing force for the seal is afforded by the annular support body 2.

Figure 10:
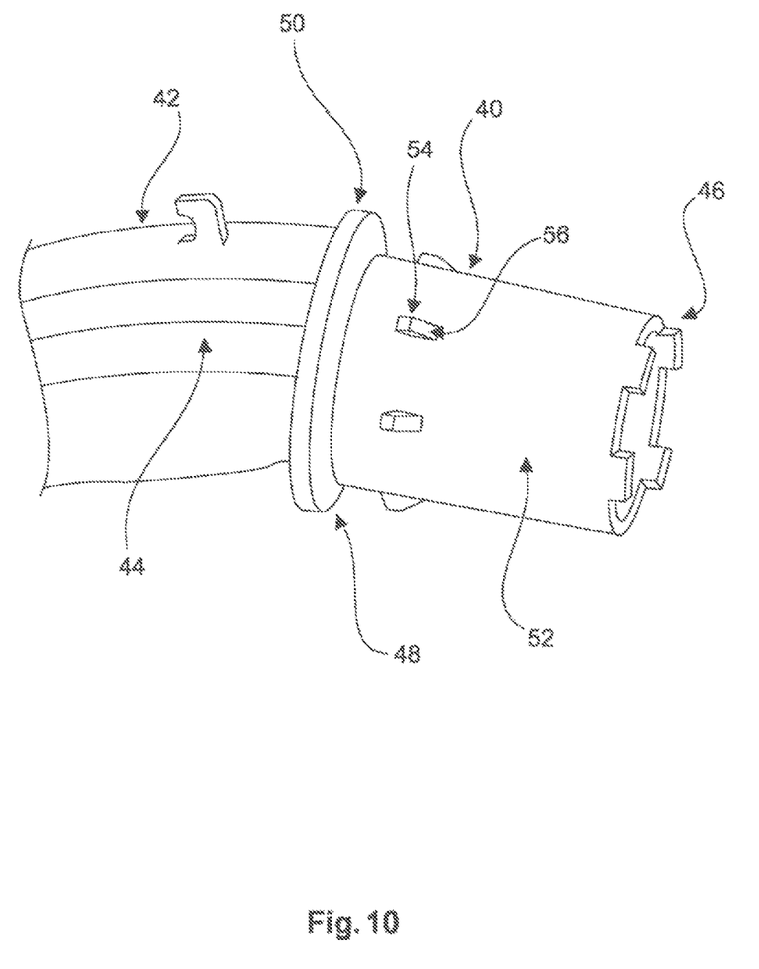
FIG. 10 shows a toy body with a rigid connection portion.

A connection portion 40 by way of example, which together with the hose 30 in FIG. 6 can also form a system according to the invention, is shown in FIG. 10. The connection portion 40 is part of a toy body 42 which includes a compartment 44 for accommodating an electrical device for operation of the massage toy. The connection portion 40 has an open end 46 from which for example a vibrator unit for the massage toy can project and can extend into the hose 30. Provided at the foot end 48 of the connection portion 40 is an axial wall 50 which co-operates with the annular projection 32 of the hose 30 (see FIG. 6) for sealing off the hose 30 relative to the connection portion 40.

The connection portion 40 has a cylindrical peripheral surface 52 which in its diameter approximately corresponds to the inside diameter of the hose 30. Second positively locking means 54 in the form of latching noses are provided on the cylindrical peripheral surface 52. As in this embodiment (see FIGS. 6 and 7) the coupling elements 4 are not provided with a guide the latching nose 54 in this embodiment (see FIG. 10) is provided with a guide 56 which in the form of an inclined surface extends rising from the peripheral surface towards the tip of the latching nose from the direction of the end 46 towards the foot end 48, that is to say it extends in such a way as to increase in diameter. When joining the hose 30 on to the connection portion 40 the coupling elements 4 are slightly lifted by that inclined surface 56, which the gauze mesh 10 of the support body 2 allows, and they then come into latching engagement in such a way that the latching noses 54 engage behind the wall 16 of the opening 14 in the coupling elements 4. That provides a positively locking connection between the elastic flexible hose 30 and the rigid connection portion 40. Insofar as in the present application the hose or the connection portion to which the hose is mounted is of a circular cross-section, any other cross-sectional shape is also possible, a preferred shape being a triangular or quadrangular or pentagonal or other, preferably closed cross-section.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A hose connecting device for connecting an elastic flexible hose to a rigid connection portion, comprising:
   at least one coupling element having first positively locking means for coupling to the connection portion in positively locking relationship; and
   an annular support body which peripherally supports the coupling element,
   wherein the positively locking means extend radially internally on the annular support body and wherein the annular support body is adapted for fixing to the flexible hose,
   further comprising a plurality of coupling elements distributed around the periphery of the annular support body, which are connected together by means of the annular support body.

2. A device according to claim 1, wherein the annular support body is of a thin-walled configuration which is non-elastic in the tangential direction.

3. A device according to claim 1 wherein the annular support body at least portion-wise comprises a mesh material.

4. A device according to claim 3, wherein the mesh material is a plastic mesh.

5. A device according to claim 4, wherein said mesh is a gauze material.

6. A device according to claim 1, wherein the coupling element having an opening which forms the first positively locking means.

7. A device according to claim 6, wherein the opening forms a portion which can be gripped behind and which can be gripped behind by a corresponding second positively locking means on the connection portion in order thereby to produce the positively locking connection.

8. A device according to claim 7, wherein the opening is surrounded by a radially inwardly projecting edge which narrows the internal free cross-section with respect to the annular support body.

9. A device according to claim 7, wherein the coupling element has a guide for guiding the second positively locking means of the connection portion when making the connection of the elastic flexible hose to the rigid connection portion.

10. A device according to claim 9, wherein the guide has an inclined surface which in the axial direction narrows the free internal cross-section from an axial end of the annular support body to the first positively locking means.

11. A device according to claim 9, wherein the coupling element has a second guide for guiding the second positively locking means of the connection portion when producing the connection of the elastic flexible hose to the rigid connection portion, which with respect to the first positively locking means is oriented towards the oppositely disposed axial end of the annular support body.

12. A device according to claim 8, wherein the guide has lateral delimitation means.

13. A hose according to claim 1, wherein the annular support body is connected to the hose by a material-bonded connection.

14. A hose according to claim 13, wherein the annular support body is integrated into the hose, wherein the first positively locking means are accessible at an inner surface of the hose.

15. A hose connecting device for connecting an elastic flexible hose to a rigid connection portion, comprising:
   at least one coupling element having first positively locking means for coupling to the connection portion in positively locking relationship; and
   an annular support body which peripherally supports the coupling element,
   wherein the positively locking means extend radially internally on the annular support body and wherein the annular support body is adapted for fixing to the flexible hose,
   wherein the annular support body is connected to a hose by a material-bonded connection.

16. A hose according to claim 15, wherein the annular support body is integrated into the hose, wherein the first positively locking means are accessible at an inner surface of the hose.

* * * * *